United States Patent
Conner (10) Patent No.: US 7,568,662 B1
(45) Date of Patent: Aug. 4, 2009

(54) EMERGENCY FLIGHT CONTROL SYSTEM

(75) Inventor: James P. Conner, Andover, MN (US)

(73) Assignee: Honeywell International Inc., Morristown, NJ (US)

( * ) Notice: Subject to any disclaimer, the term of this patent is extended or adjusted under 35 U.S.C. 154(b) by 1351 days.

(21) Appl. No.: 09/995,120

(22) Filed: Nov. 27, 2001

Related U.S. Application Data (60) Provisional application No. 60/318,984, filed on Sep. 12, 2001.

(51) Int. Cl.
B64C 13/18 (2006.01)

(52) U.S. Cl. .................... 244/175; 244/183; 244/194; 244/195; 244/118.5; 701/11; 701/16

(58) Field of Classification Search ................ 244/189, 244/76 R, 194, 118.5, 129.5, 175, 183, 195; 701/3, 16, 11
See application file for complete search history.

(56) References Cited

U.S. PATENT DOCUMENTS

| | | | | |
|---|---|---|---|---|
| 3,665,217 | A * | 5/1972 | Adams et al. | 244/194 |
| 3,749,335 | A | 7/1973 | Williams | |
| 5,531,402 | A * | 7/1996 | Dahl | 244/189 |
| 6,430,480 | B1 * | 8/2002 | Ammar et al. | 340/968 |
| 6,641,087 | B1 * | 11/2003 | Nelson | 244/118.5 |
| 2002/0029099 | A1 * | 3/2002 | Gardner | 701/3 |
| 2002/0035415 | A1 * | 3/2002 | Gardner | 701/3 |
| 2002/0158166 | A1 | 10/2002 | Lin | |

FOREIGN PATENT DOCUMENTS

| | | | |
|---|---|---|---|
| EP | 0 743 580 | | 11/1996 |
| FR | 2 107 798 | | 5/1972 |
| FR | 2584842 | * | 1/1987 |

OTHER PUBLICATIONS

Cubic Corporation, "Cubic Applies for U.S. Patent for System Designed to Assist Pilots in Emergencies", www.cubic.com/corp/news/pressreleases/2001/cubic%20safety%20device.htm, 2001 Press Releases, p. 1-2 (Dec. 10, 2001).

Jeff Long, "Landing by remote control dosn't quite fly with pilots", Chicago Tribune, Section 1, War on Terror, Technology, 1 page (Friday, Sep. 28, 2001).

International Search Report from corresponding international application PCT/US02/29039, 4 pages.

* cited by examiner

Primary Examiner—J. Woodrow Eldred
(74) Attorney, Agent, or Firm—Fogg & Powers LLC (57) ABSTRACT

A method and system for preventing the control of an aircraft from the cockpit. In an exemplary embodiment, the system could be triggered externally. For example, an air traffic control (ATC) station could determine that the aircraft has deviated from its planned flight path. If personnel at the ATC station decide that the deviation is not attributable to the actions of the authorized flight crew, the personnel can transmit a signal to the aircraft that disables all normal cockpit control of the aircraft. Once normal flight controls are disabled, the aircraft may execute a preprogrammed emergency flight plan via its autopilot system, with or without the use of a flight management system (FMS). The emergency flight plan could cause the aircraft to fly to a sparsely populated area and enter a holding pattern, or it could cause the aircraft to land in a sparsely populated area or at an airport using an autoland system.

27 Claims, 6 Drawing Sheets

EMERGENCY FLIGHT CONTROL SYSTEM

RELATED APPLICATIONS

Priority is claimed to U.S. Provisional Patent Application No. 60/318,984, entitled "EMERGENCY FLIGHT CONTROL SYSTEM," filed on Sep. 12, 2001.

BACKGROUND

1. Field of the Invention

The present invention relates to the field of aircraft flight control and, more particularly, emergency flight control.

2. Related Art

The attacks on United States soil by terrorist forces on Sep. 11, 2001 using domestic aircraft indicate that present airport security is inadequate and may never be adequate to prevent another hijacking. Airline security may be enhanced by a mechanism that deters would-be hijackers because attempted hijacking would become futile. Such a mechanism is not only applicable for domestic non-military aircraft in the United States, but also may deter terrorists from attempting a hijacking anywhere in the world. Early weapon detection and other prevention techniques may prevent hijackers from boarding an aircraft, but once the aircraft is airborne with weapons aboard, all the prevention systems and techniques are ineffective. Consequently, detection of carried-on weapons and other prevention techniques may never be capable of preventing the forced takeover of an aircraft.

While detecting the presence of some weapons carried by would-be airline passengers is possible, weapons can be made from not only disassembled components being reassembled, but also from parts of the interior of the aircraft. Airport security metal detectors and other screening methods are not capable of entirely detecting such weapons. Further, once a terrorist has taken over the aircraft, all detection systems then become questioned in their accuracy and detection methods.

The airport detection methods and apparatus, while improved, are subject to the varying skill level and attentiveness of the security attendants at any particular airport. Multiple passes through such detection systems indicate inherent flaws in accurately detecting weapons. For instance, a first pass through a metal detector may indicate that a person has sufficient metal content to trigger a positive no-go signal on a go/no-go signal standard, which is usually represented by an audible tone alerting the attendant to a potential problem. The person then removes his or her watch, which may or may not be the source of the positive trigger, and then re-passes through the metal detector not setting-off the go/no-go signal although the metal detection signal strength falls just short of a pre-set trigger level. Further, each metal detector may be calibrated to a slightly different scale, thereby allowing some higher metal content to pass through some detectors while not passing through others. Even considering a perfect metal detector scheme, such machines may not be capable of picking up plastic, ceramic, or other weapons and sub-assemblies. Like the metal detection systems, carry-on baggage detectors are subject to human skill and alertness. Human errors in detecting weapons either on-passenger or in carry-on luggage have the potential of allowing dangerous weapons in the passenger compartment of aircraft.

While the hijacking of commercial aircraft requires immediate attention and correction, aircraft safety is also affected by incapacitated flight crews. For example, pilots may suffer sudden health problems. For instance, a pilot may suffer a heart attack in-flight and, unbeknownst to other flight crew, if any other crew exists, the aircraft may veer off-course or dive from present altitude. While autopilot, if available in the present system, may be engaged in such a situation, the autopilot may require periodic inputs from the pilot. Also, autopilot may not include autoland sequencing, which may require additional inputs from the pilot or co-pilot, if any. If a pilot suffers a heart attack, a seizure, or another incapacitating event, the pilot may not be able to respond to the required periodic or queried inputs. A mechanism that allows external, i.e. non-piloted input, functional control of the aircraft thus can increase the safety of the passengers and crew of the aircraft, and can protect against destruction of property.

Another situation arises if the aircraft automatic and/or manual controls break or malfunction. The pilot may not have the ability to correctly fly the aircraft, creating a potential for devastation. Although many aircraft are "fly-by-wire" and incorporate both redundant mechanical and electrical systems to protect against failure, these systems still require wiring systems and interconnects that may prevent the pilot or other persons from controlling the aircraft. A mechanism for externally controlling the aircraft, when pilot intervention is severed provides protection in instances as described above.

SUMMARY

A method and system for preventing control of an aircraft from the cockpit is disclosed. In an exemplary embodiment, the system could be triggered internally or externally. For example, an air traffic control (ATC) station could determine that the aircraft has deviated from its planned flight path. If personnel or equipment at the ATC station decide that the deviation is not attributable to the actions of the authorized flight crew, the personnel or equipment can transmit a signal to the aircraft that disables all of the normal cockpit flight controls of the aircraft. Once normal flight controls are disabled, the aircraft may execute a preprogrammed emergency flight plan via its autopilot system, with or without the use of a flight management system (FMS). The emergency flight plan could cause the aircraft to fly to a sparsely populated area and enter a holding pattern, or it could cause the aircraft to land in a sparsely populated area or at an airport using an autoland system.

BRIEF DESCRIPTION OF THE DRAWINGS

An exemplary embodiment is described herein with reference to the drawings, in which.

DETAILED DESCRIPTION

Figure 1:
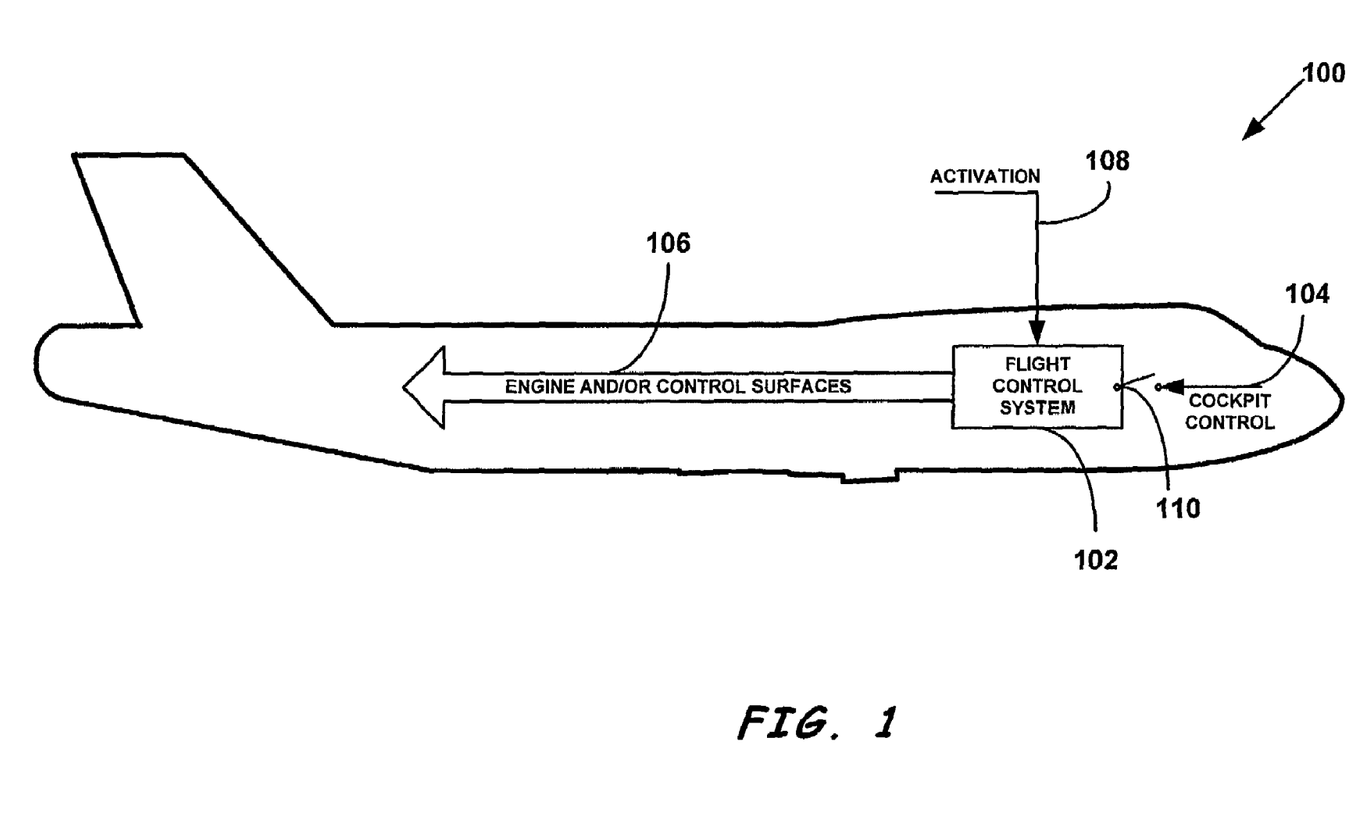
FIG. 1 is a simplified diagram of an aircraft in which an exemplary embodiment may be implemented.

FIG. 1 is a simplified conceptual block diagram illustrating an emergency flight control system 100, according to an exemplary embodiment of the present invention. Although illustrated in the context of a commercial airliner, various embodiments may be applied to other transportation environments, such as other aircraft types, watercraft, or land vehicles. Accordingly, the present application is intended to encompass these additional embodiments and others.

The system 100 includes a flight control system 102, which may normally receive inputs from a cockpit control 104. Based on the inputs from the cockpit control 104 and possibly other inputs, the flight control system 102 may control such items as one or more engines and/or control surfaces, such as flaps, rudders, etc. The emergency features of the system 100 may be initiated through an activator 108 providing an activation trigger to the flight control system 102. When the activation trigger is received at the flight control system 102, the flight control system enters a special reversionary mode and the cockpit controls 104 are disabled, such as by a switch 110 or other disabling/cutoff circuit. Switch 110 may be a functional, rather than a physical, entity. For example, switch 110 may be implemented as a set of logic instructions in a flight control computer or system that causes cockpit flight control inputs to be ignored, even though they are still received. As a result of receiving the activation trigger, subsequent flight is controlled according to the special reversionary mode, rather than by the aircraft's crew. Further details regarding the special reversionary mode may be found below.

The flight control system 102 may be comprised of a single unit, or it may be composed of several interconnected units. Examples of functional components and/or systems that may be included within an exemplary flight control system 102 include a digital or analog chronometer, an advanced flight control system, a thrust mode control panel, navigation sensors and systems such as an inertial reference system, distance measuring equipment, an instrument landing system an automatic direction finding system, etc. Flight control system 102 could also include a maintenance control and display panel, one or more engine indication/crew alerting system computers, autopilot flight director system computer(s), flight management computers, a thrust management system, etc. Such components may provide one or more of the following: warning annunciations and messages, basic flight and navigation information, flight control and steering commands, guidance navigation performance, thrust control, and flight, mode, and navigation display information. Autopilot, autoland, and/or related systems may be included. Similarly, one or more of the components or systems described above may be omitted from the flight control system 102 without departing from the intended scope of the present invention.

The cockpit control 104 acts as the pilot interface to the flight control system 102. During normal flight operation, the flight crew of the aircraft may be responsible for controlling the flight of the aircraft. An autopilot system may also be employed to provide flight control during various flight portions. Such an autopilot system may require pilot programming and/or periodic intervention to ensure proper operation. During normal operation, only a flight crew has access to the cockpit controls. During an emergency situation, such as an attempted hijacking, unauthorized persons may attempt to operate the cockpit controls.

The engine and/or control surfaces 106 may be used to control the aircraft. The flight control system 102 may provide signals to increase or decrease engine speed, for example. Steering may be accomplished through actuated control surfaces. Other functions besides control of engine and control surfaces may be performed by the flight control system's output 106.

The activator 108 may take on one or more alternative forms in order to provide the activation trigger to the flight control system 102. For example, the activator 108 may be manually initiated, such as by an aircraft's crew members (e.g., pilots, flight attendants). Similarly, an air traffic controller may provide the activation trigger to the flight control system 102 via a wireless data link. The activation trigger may also be provided by a chase plane, for example. In another alternative embodiment, the activator 108 could be automatic or partially automatic, based on sensed conditions (e.g. loss of cabin pressure, absence of a pilot's pulse or breathing, etc.). Many other alternatives are possible. Preferred implementations involve schemes that are not easy to accidentally trigger. Therefore, a cabin compartment activator would preferably take the form of a keypad for entry of a code, rather than a single button that could accidentally be pressed, although such an implementation is still intended to be within the scope of various embodiments of the present invention. In addition, safety mechanisms may be provided to prevent inadvertent activation. For example, a validating process could be provided to verify the validity of the activation trigger.

The switch 110 is shown as one means for disabling cockpit control of the flight control system 102 when the activation trigger is received from the activator 108. As an alternative to the scheme illustrated in FIG. 1, the activator 108 may directly control the switch 110 (or other disabling mechanism). Disabling the cockpit control 104 may prevent an unauthorized user, such as a hijacker, from operating the aircraft. Similarly, should the flight crew become incapacitated, the disabled cockpit control 104 may allow for automatic aircraft operation, which may be more favorable than attempts by remaining crew or passengers to operate the aircraft.

The special reversionary mode described above may take on one of several forms. Upon disabling control of the aircraft from the cockpit, control may be transferred to another entity, such as a pre-programmed flight plan or an external control entity (e.g. an air traffic control center, an airline's operations control center, or a pilot in another aircraft).

According to one embodiment, on-board avionics equipment reverts to a predetermined emergency flight plan. Such a flight plan may, for example, navigate the aircraft to a "safe zone." In the embodiment, the emergency flight plan may immediately begin descent or ascent to a safe altitude and upon arrival at the safe zone, enter a holding pattern. Executing a holding pattern would permit another aircraft to approach the aircraft in an attempt to assess the situation. Several safe zones could be defined and could include areas over water or sparsely-populated land areas. The nearest safe zone could be automatically selected based on the aircraft's present position, according to an exemplary embodiment. Position may be determined by an inertial navigation system, a global positioning system, or a ground-based system, or a combination of these, for example.

According to another exemplary embodiment, control of the aircraft may be transferred to a system external to the aircraft, such as an air traffic control entity. This could be a ground-based system or a system on board another aircraft (e.g., a "chase plane"). The external control could be used to direct the disabled aircraft to a safe zone or suitable landing site. A properly equipped aircraft could be commanded to execute an automated or partially automated landing via external control or a preprogrammed emergency flight plan.

The system could also be designed to allow cockpit control of the aircraft to resume once an emergency has subsided. Any method or system used to verify a request for resumption of normal control of the aircraft could be used. For example, an aircraft crew member could enter a special code on a keypad or speak a particular command into a voice recognition system. Normal control could also be resumed after a predetermined time period has elapsed, or after the aircraft has flown to a particular area (e.g., a sparsely populated, relatively safe area). In the event that a crewmember is coerced into causing cockpit control to resume, an external activation trigger as described above could simply cause the reversionary mode to be entered again. It would also be possible to lock out any resumption of normal cockpit control if such control has been attempted one or more times and the aircraft has not resumed an authorized, safe, or expected flight path under cockpit control, thus preventing a hijacker from coercing a crewmember into allowing the hijacker to regain control of the aircraft.

Aircraft and air traffic control (ATC) typically communicate with each other in several different ways. The pilot and ATC are in contact by voice communication. Also, ATC usually monitors the aircraft through radar. The radar provides information on the aircraft's ground speed, ground track and altitude.

Additionally, commercial passenger aircraft often employ an aircraft communication addressing and reporting system (ACARS). This system is typically used by an airline's control center to receive maintenance information about the aircraft. ACARS is typically a one-way link, but may also be implemented as a two-way link. One limitation of the radar and ACARS systems is that they typically do not provide information from the aircraft's flight control system. It is possible to implement additional systems that provide more complete information, such as position, direction, air speed and information about the aircraft's control settings, like flaps settings, landing gear position and engine power settings. It is also possible to attach a transmitter to the aircraft (or utilize an existing transceiver) to communicate this additional information.

Remote Triggering

In one embodiment an ATC such as ATC 400 (FIG. 2) may send a signal 402 to an aircraft, such as aircraft 404, to trigger the system 100. In another embodiment the system 100 can be triggered by a control center for the airline, such as an airline's ACARS 406.

Figure 3:
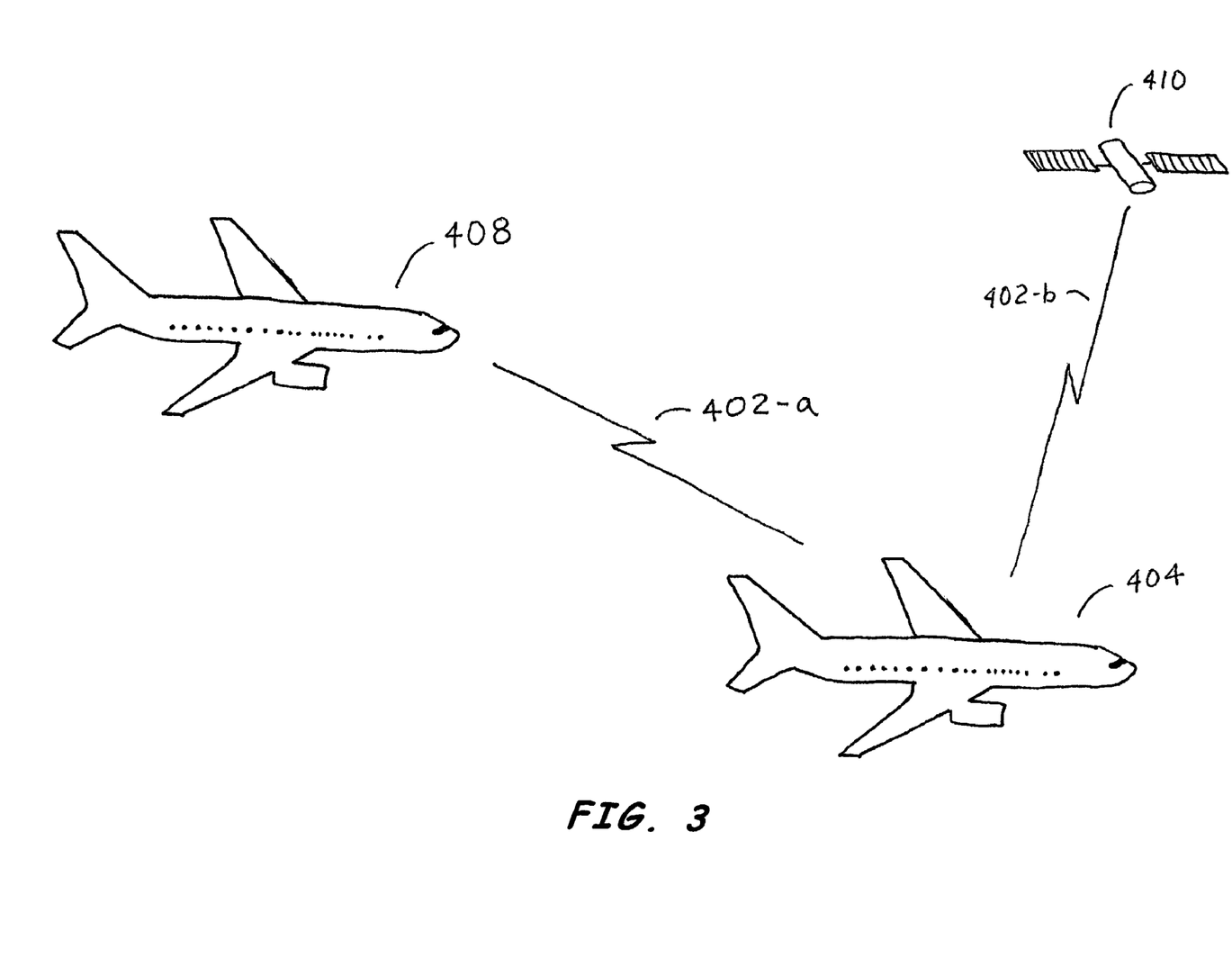
FIG. 3 is another simplified diagram of a signal transmission system that could trigger a system in accordance with the exemplary embodiment.

As shown in FIG. 3, a chase plane 408 could also trigger the system by sending signal 402-*a* to aircraft 404. This embodiment would allow chase plane 408 to approach aircraft 404 and assess the situation before making the decision to trigger the system, thereby reducing the possibility of making an erroneous triggering decision. Triggering from a chase plane would be advantageous because a shorter distance between the transmitter and the aircraft's receiver would allow for implementation with a weaker transmitter or receiver, and it would reduce the possibility of outside interference with the signal, thereby increasing security.

As further shown in FIG. 3, signal 402-*b* could be sent to aircraft 404 from a satellite 410.

Figure 2:
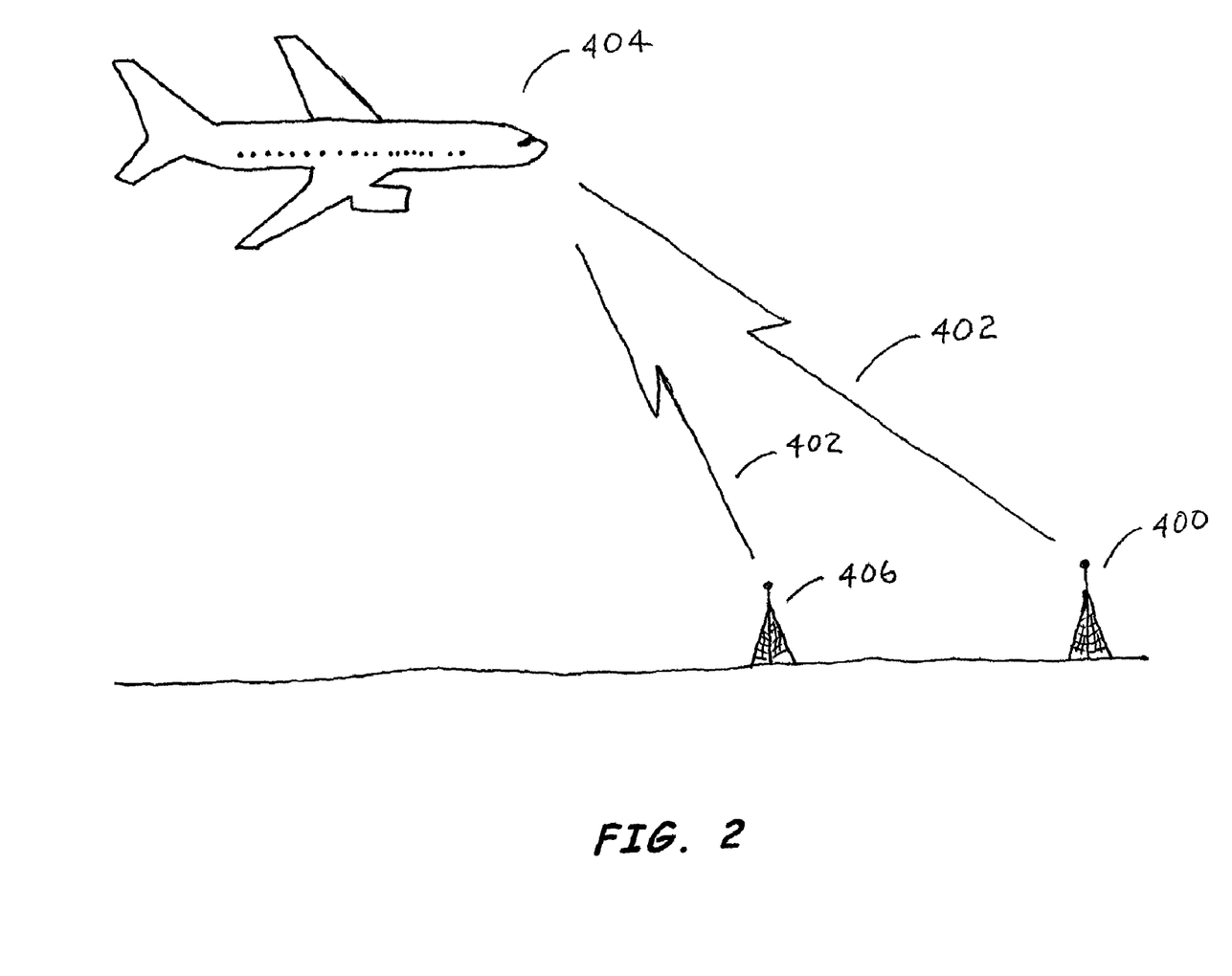
FIG. 2 is a simplified diagram of a signal transmission system that could trigger a system in accordance with the exemplary embodiment.

A remote signal such as signal 402, 402-*a*, or 402-*b* can be sent to the aircraft through any number of traditional communications methods. It can be sent using various frequencies, such as UHF or VHF, for example. In an exemplary embodiment, the link between the remote transmitter and the aircraft may be encrypted. Encryption is a method through which an original signal is altered according to a known format and sent to another location. When it arrives at the second location the signal is restored to its original form using a secret key. Only an entity possessing the secret key can restore the encrypted signal to its unencrypted, original form. This process provides data security by preventing others from acquiring the encrypted signal, converting it back to its unencrypted form and reading the original message. The use of encryption also prevents others, who do not have the secret code, from intentionally or unintentionally sending signals to the aircraft that trigger the system.

Encryption can be implemented using any number of known methods, such as asymmetric (public-key) encryption or symmetric encryption. It is possible to use one or more methods in an implementation. Using multiple encryption methods, for instance at difference frequencies transmitted to the aircraft, can provide additional redundancy and security to the aircraft.

In an exemplary embodiment, the remote link between the transmitter and the aircraft may be digital. The use of a digital signal has advantages over using an analog signal. Digital signals provide better noise rejection and reduce outside interference with the signal. This prevents the system from misinterpreting the signal and performing an erroneous action or from not understanding the signal and performing no action.

Remote Control

Once the system 100 is triggered from a remote location, or from within the aircraft, it may be possible to control the aircraft remotely through a remote communication link, according to various embodiments.

In one embodiment the remote communication link sends data to one of the aircraft's systems that causes the aircraft to fly in a preprogrammed flight pattern.

In another embodiment the remote communication link can be used to send a newly selected flight path to the aircraft.

A further embodiment allows the aircraft to be flown remotely in real-time. Full control of the aircraft's engines, flaps, landing gear and other systems rests in a remote pilot. The aircraft could be flown remotely using the basic information provided by ATC's radar, or, for more precision, the system can implement means to provide the remote fliers with additional flight information.

The remote control of the aircraft can be used to fly the aircraft away from a heavily populated area. The aircraft could be flown to location to be landed or it could be taken to a location (such as over water or a deserted area) to be crash-landed. These options allow the people controlling the aircraft remotely to select the best course to safely aid the people on the aircraft while minimizing the danger to other people on the ground.

Remote control of the aircraft can be obtained in several different ways. The remote link can send information to the aircraft's flight management system (FMS). Control can also be achieved by communicating directly with the aircraft's autopilot system.

In one embodiment, the remote link communicates directly with the aircraft's flight control computer. One advantage of this implementation is that it can be used on an aircraft that doesn't have an FMS. Another advantage is that this system would be harder to disable than one that communicates with the FMS. The flight control computer is typically further removed from access by the human operators than the FMS. This would make it more difficult for those on the aircraft to disable the system.

Another embodiment allows the system to be remotely deactivated. This is desirable if the system was mistakenly activated or if a change in circumstances no longer warrants using the system. Deactivation from the aircraft is possible, but not preferred, due to the possible ability of a hijacker to deactivate the system.

Figure 4:
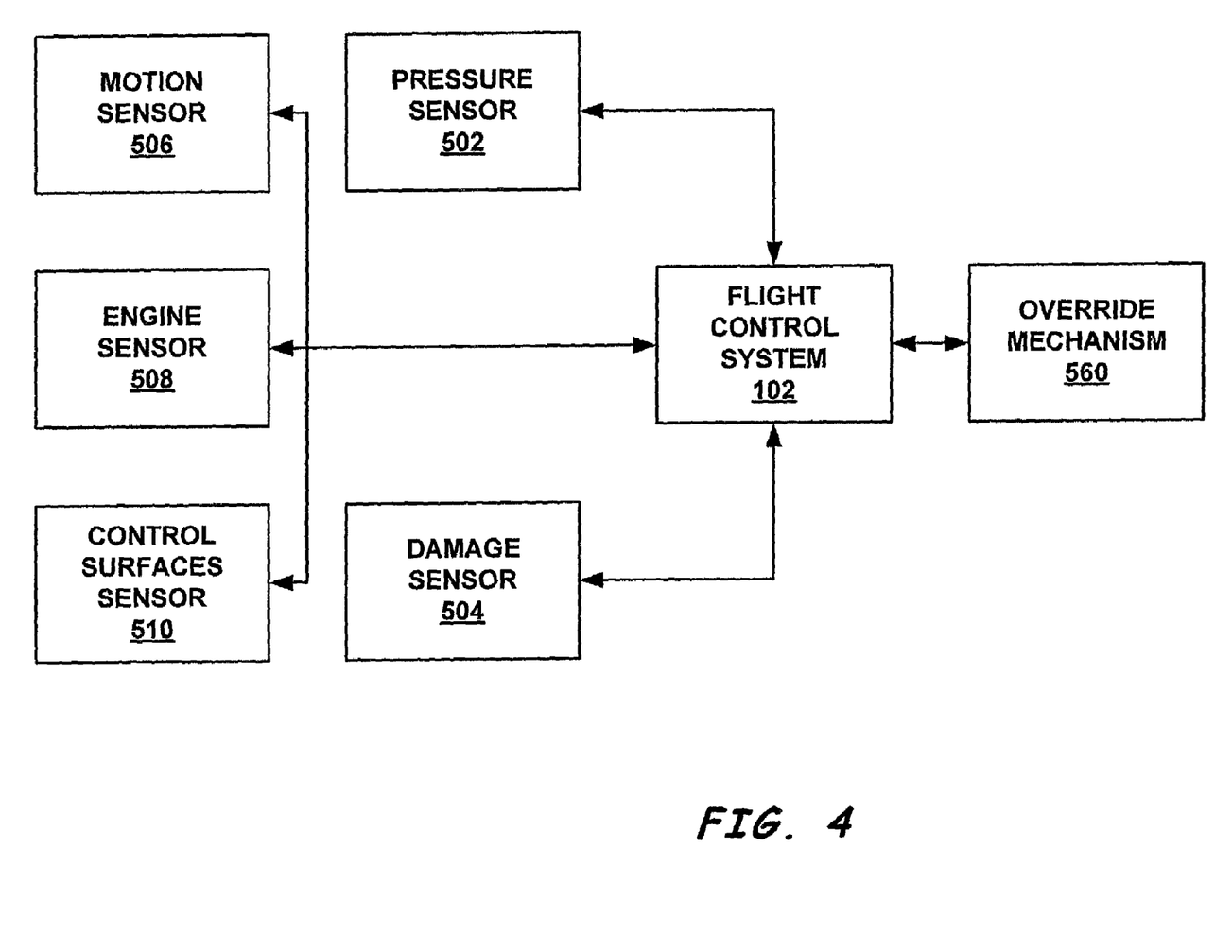
FIG. 4 is a simplified block diagram illustrating several components that may provide functionality according to an exemplary embodiment.

Turning now to FIG. 4, another exemplary embodiment of the present invention is shown. In this exemplary embodiment, automatic activation of the flight control system 102 may occur. Thus, the flight control system 102 may take control of the engine and/or control surfaces 106 in response to a dangerous condition that occurs aboard the aircraft. For example, a loss of cabin pressure at a high altitude (e.g., 30,000 ft.) may deplete the amount of oxygen present in the aircraft and incapacitate the flight crew. In this instance, a pressure sensor 502 on the aircraft may detect the lowered pressure and serve as the activator 108 to activate the flight control system 102. For example, the damage sensor 504 may be a vibration sensor to detect vibrations caused by a damaged aircraft component. The flight control system 102 may then cause the aircraft to descend rapidly to an altitude where more oxygen is present (e.g., 10,000 ft.).

Furthermore, the aircraft may have a damage sensor 504 that detects damage to the aircraft. For example, damage to the aircraft may be caused by a bird or other animal, a missile, another aircraft, a stationary object, or a sudden maneuver by the aircraft. In these instances, the damage sensor 504 could detect the damage to the aircraft and activate the flight control system 102. The flight control system 102 may then cause the aircraft to begin an emergency procedure, such as flying in a holding pattern, attempting a crash landing, or landing at a nearby airport. It should be understood that the examples described in this exemplary embodiment are intended to illustrate, not limit, the spirit and scope of the present invention, and that damage to the aircraft and the response to such damage may occur in a variety of ways.

In addition, automatic activation of the flight control system 102 may also occur if the aircraft undergoes a sudden maneuver. For example, if the aircraft suddenly dives towards the ground, a motion (or acceleration) sensor 506 may detect this movement and activate the flight control system 102. The flight control system 102 may then ease the aircraft's descent and send the aircraft into a holding pattern. It should be understood that a wide variety of sudden maneuvers may occur that trigger the automatic activation of the flight controller, such as, but not limited to, dives, sudden banks or rolls, and spins. Preferably, maneuvers normally executed during the course of a typical flight will not provide the activation trigger.

Automatic activation of the flight control system 102 may also occur if the engines and/or control surfaces 106 of the aircraft malfunction. Preferably, the aircraft has an engine sensor 508 and a control surfaces sensor 510 to detect dangerous changes in the engines and control surfaces, respectively. For example, the engine sensor 508 may detect if one engine breaks down and notify the flight control system 102. The flight control system 102 may then utilize the remaining engines to begin an emergency procedure, such as flying in a holding pattern, attempting a crash landing, or landing at a nearby airport. Likewise, if a control surface such as a rudder or aileron malfunctions, the control surfaces sensor 510 may activate the flight control system 102. The flight control system 102 may then begin an emergency procedure such as an attempted landing.

According to various embodiments, automatic activation of the flight control system 102 may occur when a malfunction has occurred aboard the aircraft, or when the aircraft has been damaged. Thus, it may be acceptable in some circumstances to maintain an override mechanism 560 that the pilot may activate when the pilot believes he or she can handle the dangerous situation better than the flight control system 102. The flight control system 102 may differentiate between automatic activation as opposed to manual activation and the remote activation discussed previously, and the override mechanism 560 may only be operable in an automatic activation scenario. It should further be understood that many alternate embodiments exist that lie within the spirit and scope of the present invention, and that other sensors and configurations may be used. As another alternative, automatic activation may occur due to the aircraft failing to respond to or heed signals sent from ATC.

Figure 5:
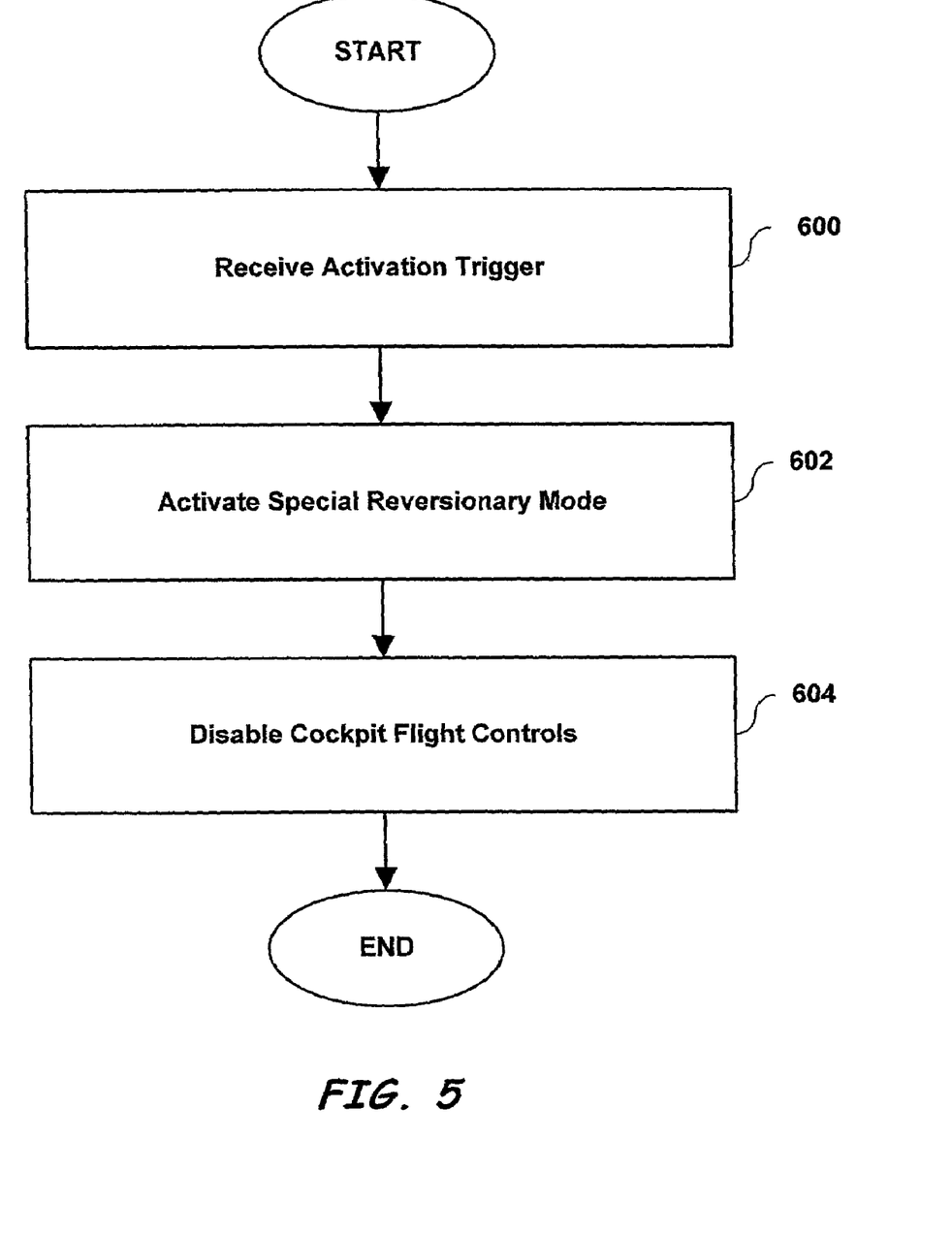
FIG. 5 is a flow chart depicting functions performed in accordance with the exemplary embodiment.

FIG. 5 is a flow diagram illustrating a method for providing emergency flight control. The aircraft receives an activation trigger, step 600. The activation trigger is a signal from inside or outside the aircraft to begin the process of engaging the system to take operational control away from those onboard the aircraft. When the remote activation trigger is received, the system activates a special reversionary mode shown at 602. The special reversionary mode may, for example, automatically control the aircraft according to one or more pre-programmed flight patterns. It may also control the aircraft from a remote location by sending the aircraft a determined flight plan or by controlling the aircraft in real-time.

As shown at step 604, the cockpit flight controls may be disabled. Disabling the onboard flight controls prevents a person aboard the aircraft from controlling its operations and defeating the automatic or remote control.

In another embodiment the cockpit flight controls are disabled before the special reversionary mode is activated. It is preferable, however, that only a short delay occurs between disabling the flight controls and activating the special reversionary mode.

Figure 6:
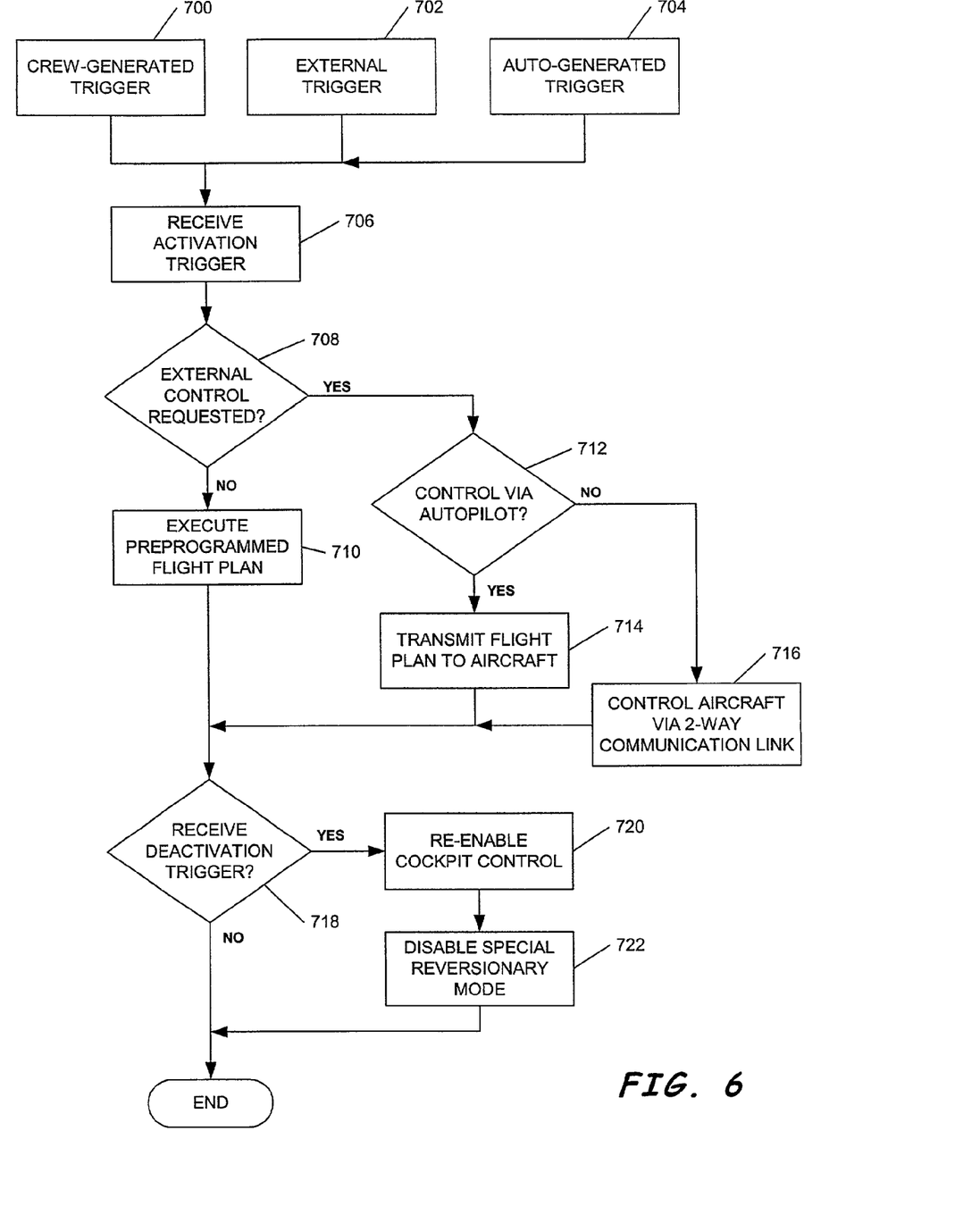
FIG. 6 is another flow chart depicting functions performed in accordance with the exemplary embodiment.

FIG. 6 is a flow diagram illustrating an exemplary operation of an emergency flight control system. As shown at 700, the crew triggers the system. This may be through the use of one or more devices on the aircraft, such as a button or combination of buttons, or through any other method of sending a signal. Alternatively, the system is activated by an external trigger, illustrated at 702. The external trigger can be a signal sent from a remote location. The location may be from ATC, a control center of the aircraft's airline, a government facility, a chase plane or another location. The signal may be a digital or analog communication signal. It may be sent using any number of available frequencies, such as UHF or VHF. Encryption may also be used.

Step 704 illustrates activation through an automatically generated trigger. This trigger may originate from the aircraft's flight management system, flight control computer, or another device. An event, such as a deviation from an intended flight pattern, an explosive decompression of the cabin, a sudden loss of altitude or an erratic flight path may be programmed to trigger the system. Other events, or a combination of events, may also be used to trigger the system.

Once the activation trigger is generated, it is received by the system, as shown at step 706. Upon receipt of the signal, the system must make an election regarding control of the aircraft, as shown at step 708. If the signal does not request external flight control, then the system may execute a preprogrammed flight plan, as shown at step 710. The preprogrammed flight plan may be stored in the aircraft's autopilot, flight management system, flight control computer, or at another location. A signal that is generated internally, like the crew-generated trigger, likely would not request external fight control, because the signal is not being generated from a remote location having equipment and/or personnel (e.g., ATC center) that could control the aircraft. Likewise, an automatically generated trigger likely might not request external flight control because it is also a signal originating internally.

If the signal or trigger does "request" external flight control, the system must additionally determine if the external control of the aircraft should be via autopilot, as shown at step 712. If the signal requests the use of autopilot, the entity sending the signal may also transmit a flight plan to the aircraft, as shown at step 714. The flight plan may be updated one or more times during the operation of the system. This allows ground controllers to change the path of the aircraft as changing circumstances may warrant.

In another implementation, the signal may be used to generate external control via a two-way communications link with the aircraft, as shown at step 716. In this implementation a pilot in a chase-plane may be able to remotely fly the aircraft in real-time while receiving various data from the aircraft. In a preferred embodiment, the two-way communications link sends information about the aircraft's control settings, engine power level, fuel level, landing gear position, air speed, and any other necessary or desirable information to the remote location where the information may be used in flying the aircraft.

As shown at step 718, the aircraft may, subsequent to receiving an activation trigger, receive a deactivation trigger. A deactivation trigger could be generated within or outside of the aircraft once authorized personnel determine that a hijacking or other danger to the aircraft no longer poses a threat. The deactivation trigger could be generated either in-flight or after the flight has safely ended. As an example, a member or members of the crew could enter a password on a keypad to deactivate the system while in flight; a weight-on-wheels or airspeed indication could also be used to determine that the aircraft has landed, resulting in a deactivation trigger being generated.

In the event that a hijacker forces a crewmember to deactivate the system, the process of activating the system as described above could simply be repeated upon external or onboard detection of an unauthorized deviation from an expected or safe flight path. In such an event, it would also be possible to lock-out future attempts to deactivate the system while the aircraft is still in flight.

At step 720, if the system receives a deactivation trigger, cockpit control of the aircraft may be re-enabled, and the special reversionary mode could be disabled (step 722).

Embodiments of the present invention may be implemented using some components from current aircraft. For example, positioning equipment, such as inertial reference and GPS, combined with a Flight Management System (FMS) provide navigation and can be coupled with systems to fly an aircraft along a pre-programmed course. According to embodiments of the present invention, the FMS system could be modified to revert to an emergency flight plan or to accept an emergency flight plan from an external command source. Communications between the FMS and the external entity could be provided using navigation-band and/or communication-band radios, satellite communications (e.g. SATCOM), and/or other communication systems. Security and authentication may be implemented using encryption techniques and equipment. In an alternative embodiment, Category III autoland capabilities may be utilized to safely land a hijacked aircraft in an emergency situation. In another alternative embodiment, a collision avoidance system may be used, such as to inform nearby aircraft that a reversionary mode has been entered.

Exemplary embodiments of the present invention have been illustrated and described. It will be understood, however, that changes and modifications may be made to the invention without deviating from the spirit and scope of the invention, as defined by the following claims.

I claim:

1. A method for controlling an aircraft, comprising:
   receiving a first trigger;
   disabling cockpit control of the aircraft in response to the first trigger; and
   enabling a special reversionary mode to control the aircraft in response to the first trigger;
   wherein the first trigger is based on the aircraft's deviation from a planned flight path.

2. The method of claim 1, further comprising:
   generating the first trigger, wherein the first trigger is generated outside the aircraft.

3. The method of claim 1, wherein the first trigger is generated within the aircraft.

4. The method of claim 3, wherein the first trigger is generated without human input.

5. The method of claim 3, wherein the first trigger is generated using human input.

6. The method of claim 2, wherein the first trigger comprises an encrypted signal.

7. The method of claim 1, further comprising:
   sensing a triggering event; and
   generating the first trigger in response to the event.

8. The method of claim 1, further comprising:
   receiving a second trigger subsequent to receiving the first trigger;
   re-enabling cockpit control of the aircraft in response to receiving the second trigger.

9. A method for controlling an aircraft, comprising:
   sensing a first triggering event;
   generating a first trigger in response to the first triggering event;
   receiving the first trigger;
   disabling cockpit control of the aircraft in response to the first trigger; wherein the first triggering event is based on a sudden maneuver of the aircraft; and
   enabling a special reversionary mode to control the aircraft in response to the first trigger.

10. Apparatus for controlling an aircraft, comprising:
    an activator for generating an activation trigger; and
    a switch communicatively coupled to the activator, the switch disabling cockpit control of the aircraft in response to the activation trigger, the activation trigger further enabling a special reversionary mode, wherein the special reversionary mode comprises entering into a predefined flight path.

11. The apparatus of claim 10, wherein the special reversionary mode causes the aircraft to execute a safe, pre-programmed flight path.

12. The apparatus of claim 10, wherein the activator comprises a transceiver that receives a signal from outside the aircraft and responsively generates the activation trigger.

13. The apparatus of claim 10, wherein the activator comprises a manually activated switch onboard the aircraft.

14. The apparatus of claim 13, wherein the manually activated switch comprises at least one keypad.

15. The apparatus of claim 10, wherein the activator comprises a flight path sensor.

16. The apparatus of claim 12, wherein the signal is encrypted.

17. The apparatus of claim 10, further comprising:
a deactivator for generating a deactivation trigger;
wherein the switch is communicatively coupled to the deactivator, the switch re-enabling cockpit control of the aircraft in response to receiving the deactivation trigger; and
wherein the deactivation trigger also disables the special reversionary mode.

18. The apparatus of claim 17, wherein the deactivator comprises a manually activated switch onboard the aircraft.

19. The apparatus of claim 18, wherein the manually activated switch comprises at least one keypad.

20. The apparatus of claim 17, wherein the deactivator comprises a sensor that indicates the aircraft has landed.

21. A method for controlling an aircraft, comprising:
receiving a first trigger;
disabling cockpit control of the aircraft in response to the first trigger; and
enabling a special reversionary mode to control the aircraft in response to the first trigger;
wherein the first trigger is based on a cabin air pressure sensor or a vibration sensor.

22. The method of claim 21, wherein the special reversionary mode comprises entering into a predefined flight path.

23. The method of claim 22, wherein the special reversionary mode causes the aircraft to execute a safe, pre-programmed flight path.

24. The method of claim 1, wherein the special reversionary mode comprises entering into a predefined flight path.

25. The method of claim 24, wherein the special reversionary mode causes the aircraft to execute a safe, pre-programmed flight path.

26. The method of claim 9, wherein the special reversionary mode comprises entering into a predefined flight path.

27. The method of claim 26, wherein the special reversionary mode causes the aircraft to execute a safe, pre-programmed flight path.

* * * * *